United States Patent [19]
Holcomb et al.

[11] Patent Number: 5,145,380
[45] Date of Patent: Sep. 8, 1992

[54] PATCH PANEL

[75] Inventors: Bruce D. Holcomb, Glencoe; Franklin D. Lantz, Chicago, both of Ill.

[73] Assignee: Homaco, Inc., Chicago, Ill.

[21] Appl. No.: 716,238

[22] Filed: Jun. 17, 1991

[51] Int. Cl.$^5$ .............................................. H01R 9/24
[52] U.S. Cl. ..................... 439/49; 379/325; 439/922
[58] Field of Search ............. 439/43, 49, 54, 709, 439/712, 718, 719, 922; 379/325–332, 399, 397; 361/426, 428, 429

[56] References Cited

U.S. PATENT DOCUMENTS

| | | | |
|---|---|---|---|
| D. 308,061 | 5/1990 | DeLuca | 439/719 |
| 3,665,377 | 5/1972 | MacKenzie, Jr. | 439/719 |
| 4,018,997 | 4/1977 | Hoover et al. | 439/49 |
| 4,117,273 | 9/1978 | Gautier et al. | 439/43 |
| 4,678,251 | 7/1987 | Willard | 439/43 |
| 4,782,427 | 11/1988 | Marks | 361/428 |
| 4,811,169 | 3/1989 | DeLuca et al. | 439/719 |

OTHER PUBLICATIONS

Product Application Bulletin 631-400-111, published by AT&T, Apr. 1988.

*Primary Examiner*—Neil Abrams
*Attorney, Agent, or Firm*—Anthony S. Zummer

[57] ABSTRACT

A commnication system patch panel is the subject matter of the present disclosure. The present patch panel provides a convenient device for selectively connecting a wire from one plurality of wires to a selected wire of another plurality of wires. The patch panel includes a front side having an access opening on its front side. The patch panel includes a mounting plate which is adapted for being mounted on a vertical surface. A plurality of connector blocks is mounted on one side of the mounting plate. A portion of the connector blocks is adapted to be connected to wires which are connected to a communication network. Each of the connector blocks of the remainder of the connector blocks is adapted to be connected to wires which are connected to terminals. Each of the blocks adapted to be connected to a wire connected to a communication network is connected to a respective network jack. The network jacks are mounted on one side of the mounting plate at the front of the patch panel. Each of the blocks adapted to be connected to a wire connected to a terminal is connected to a respective terminal jack. The terminal jacks are mounted on the one side of the mounting plate at the front of the patch panel. The network jacks and the terminal jacks are adapted to receive opposed ends of a patch cord for electrically connecting a selected network jack to a selected terminal jack.

20 Claims, 3 Drawing Sheets

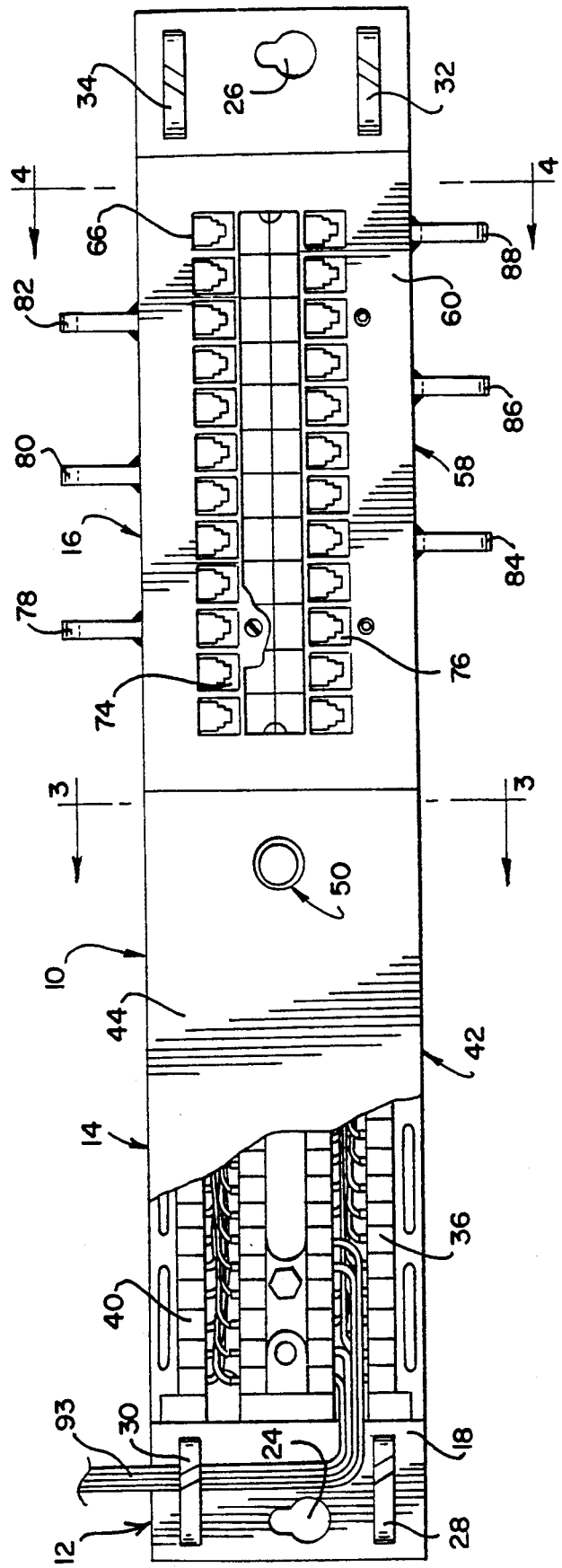

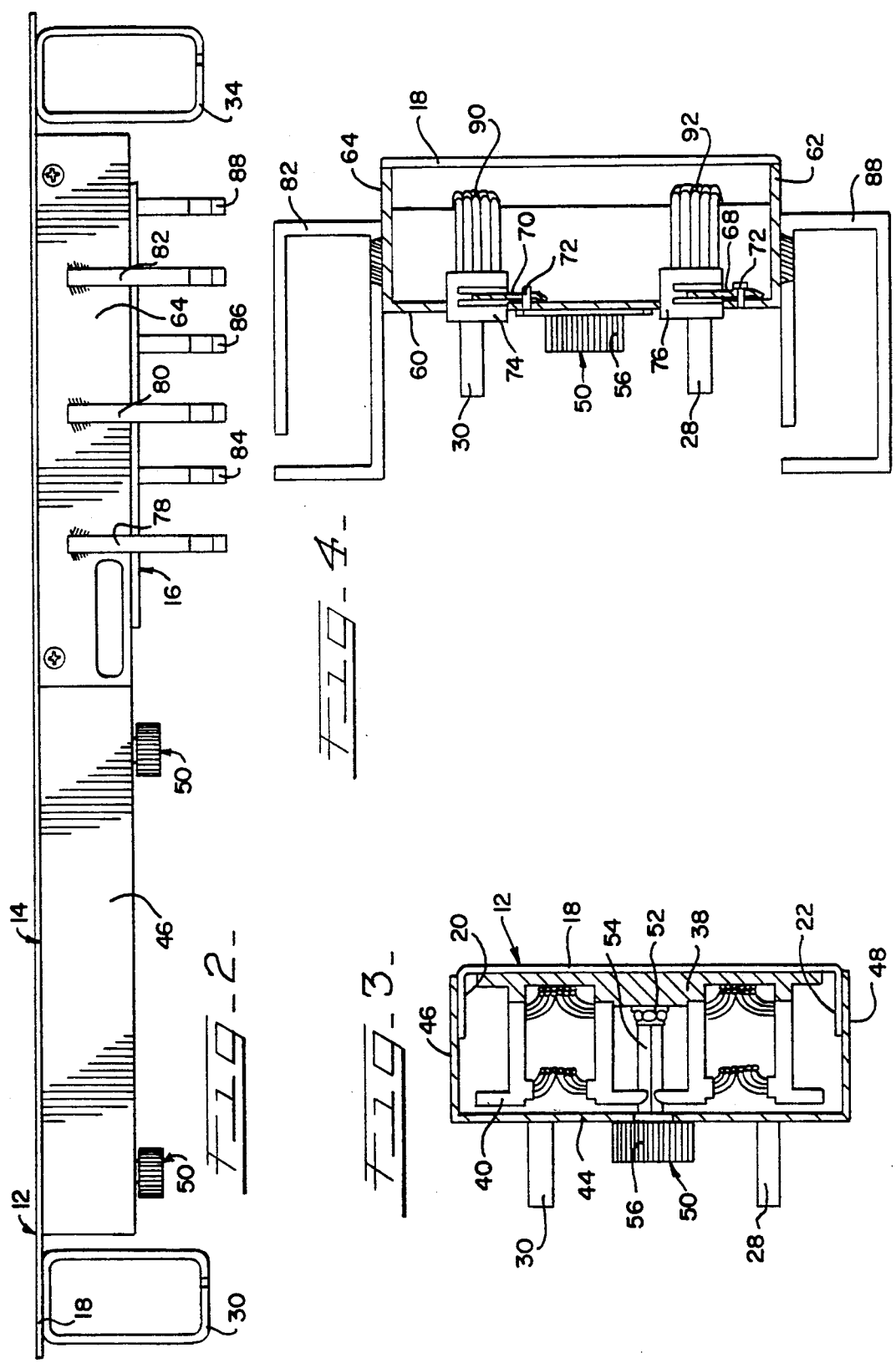

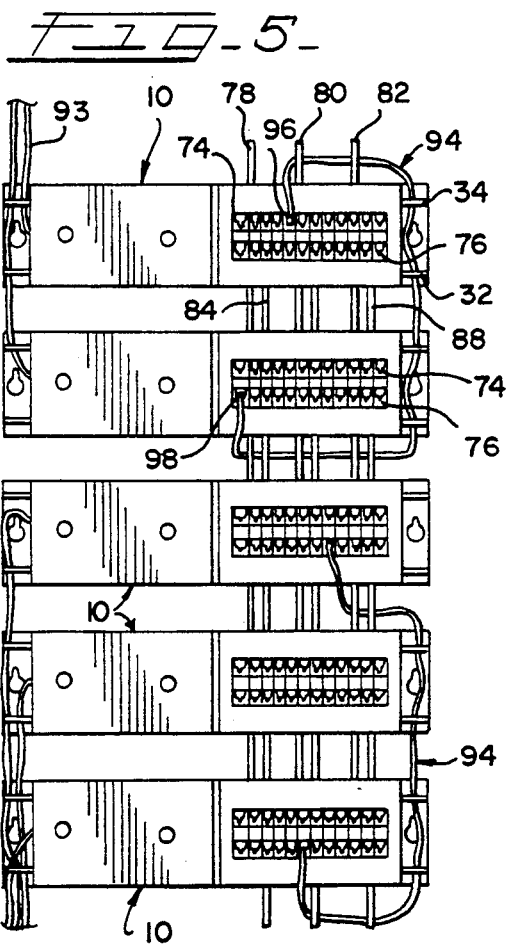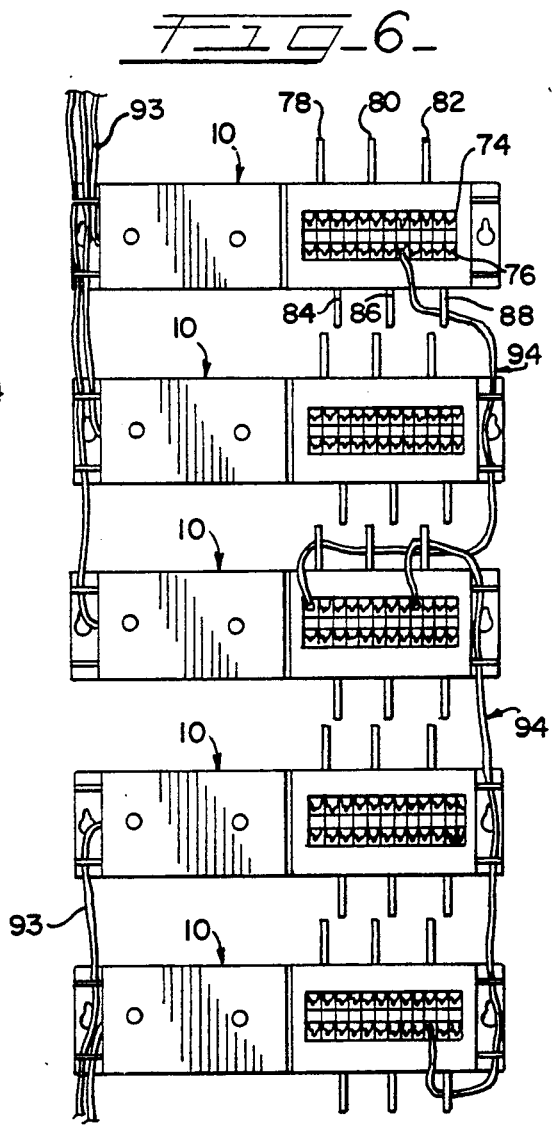

PATCH PANEL

BACKGROUND OF THE INVENTION

Present day communication systems not only include telephones, but also facsimile machines, computers, and other devices which utilize the transmission equipment which heretofore has been referred to as part of a telephonic communication system.

Modern day offices are often made up of, a general work area, a plurality of semi-private work areas which are divided by movable walls or private offices with permanent walls. As personnel responsibilities are changed, the physical location of these personnel is often rearranged. It is necessary to provide telecommunication to personnel in a modern business. The most common piece of telecommunication equipment is the telephone instrument. Heretofore a person had a given telephone number. When the location of that person was changed, there arose a problem with an identification of the telephone instrument which was readily available to that person. Typically, a telephone instrument is available in each area. The person who moved would simply have a new office telephone number or a new extension. In many organizations where individuals are prone to move, it is a problem and expensive to print new telephone directories each time there is a move. Furthermore, if the individual has a substantial amount of customer contact, it is desirable for the customer to keep that individual's telephone number rather than make periodic changes and thereby increase the possibility of a loss of the number or create an error in recording the number.

Many businesses recognize that there is a substantial value to keeping the same number or extension for many of their personnel. The typical method to change the number at a given location, whether it be a private office or a specific area in a semi-private or open area office, was to have an installer disconnect the wires from one location in a terminal box and reconnect them to another location. This method of making a change has a number of disadvantages. It is expensive to bring in a telephone installer every time a change is made. The schedule of the installer and the schedule of the moving of personnel must be coordinated thereby providing an opportunity for a failure to have synchronous change. In addition, disconnection and reconnection often is disruptive of the telephone system.

It is desirable to provide a patch panel for a communication system wherein the location of a particular instrument terminal may be readily and easily changed with a minimum of effort and by a relatively unskilled person. A further objective of the present invention is to provide an improved patch panel construction for use in a communication system which maybe readily installed and easily maintained.

SUMMARY OF THE INVENTION

The present invention is directed to an improved patch panel for use with a communication system. The patch panel is used to provide a convenient means for interconnecting selected wires, which are connected to a communication network, with selected wires, which are connected to terminals. The instant patch panel includes a mounting plate which is adapted for mounting on a vertical surface, such as, a wall. A plurality of network connector blocks is mounted on one side of the mounting plate. The network connector blocks are adapted to be connected to respective wires which are connected to selected respective portions of a communication network. A plurality of terminal connecter blocks is adapted to be connected to terminals through terminal wires. Each of the network blocks is connected to a respective network jack. Each of the network jacks is mounted on the one side of the mounting plate and is spaced from the network connector blocks. Each of the terminal connector blocks is connected to a respective terminal jack. Each of the terminal jacks is mounted on the one side of the mounting plate and is spaced from the terminal connector blocks. The network jacks and the terminal jacks are adapted to receive opposite ends of respective patch cords for selectively connecting a selected network jack to a selected terminal jack to connect a selected portion of the communication network with a selected terminal.

BRIEF DESCRIPTION OF THE DRAWINGS

FIG. 1 is a front elevational view of a patch panel, which is a specific embodiment of the present invention, but with a portion of a block housing and a jack housing broken away in order to show better the interrelationship of some of the parts of the subject patch panel;

FIG. 2 is a top view of the patch panel shown in FIG. 1;

FIG. 3 is a cross section view taken on line 3—3 of FIG. 1 showing a portion of the interior of the instant patch panel at a block housing;

FIG. 4 is a cross section view taken on line 4—4 of FIG. 1 showing a portion of the interior of the present patch panel at a jack housing;

FIG. 5 is a front elevational view showing five of the instant patch panels mounted on a vertical surface with rings of adjacent patch panels interlocked; and FIG. 6 is a front elevational view of five of the subject patch panels mounted on a vertical surface but arranged with adjacent patch panels separated so that the rings of adjacent patch panels are separated.

DESCRIPTION OF A SPECIFIC EMBODIMENT OF THE INVENTION

Referring now to the drawings and especially to FIG. 1, a patch panel generally indicated by numeral 10 is shown therein and is a specific embodiment of the herein disclosed invention. Patch panel 10 generally includes a mounting plate 12 with a connector block assembly 14 adjacent to one end of the mounting plate and a jack assembly 16 on the other end of the mounting plate.

Mounting plate 12 generally includes a flat wall plate 18 with a pair of lips 20 and 22 formed integral therewith and extending outward from wall plate 18. The mounting plate has a keyhole aperture 24 adjacent to one end and a second keyhole aperture 26 adjacent to the other end. A pair of cable split rings 28 and 30 is mounted on the mounting plate adjacent to keyhole aperture 24. The cable split rings 28 and 30 are identical to each other in their construction, and they are welded to the mounting plate in an attitude substantially perpendicular to the mounting plate. A pair of patch cord split rings 32 and 34 is mounted on the mounting plate adjacent keyhole aperture 26. Split rings 32 and 34 are identical to each other in their construction, and they are welded to the mounting plate substantially perpendicular to the plate adjacent to keyhole aperture 26.

The connecter block assembly 14 generally includes a plurality of conventional and well known punch connector blocks. The punch connector blocks include a plurality of network connector blocks 36 which is mounted in a substantially straight line on a base 38 and another plurality of terminal connector blocks 40 which is mounted on base 38 in a substantially straight line substantially parallel to the line of network connector blocks. The network connector blocks 36 and terminal connector blocks 40 are identical in construction to each other, the difference in nomenclature being to identify their function when they are operational in this specific embodiment of the invention. It being understood that either may be operable for the other's functions depending upon the wiring to the connector blocks. The base is secured to the flat wall plate adjacent to keyhole aperture 24.

The connector block assembly includes a block housing 42 which covers and protects the network connector blocks and the terminal connector blocks. The block housing includes a block front cover 44 and a pair of parallel block housing edges 46 and 48 formed integral with the block front cover substantially perpendicular to the block front cover. Edges 46 and 48 matably receive lips 20 and 22 with the lips 20 and 22 in contact with edges 46 and 48, respectively. A pair of identical housing fasteners 50 secures the block housing to base 38 and thereby the mounting plate. Each of the housing fasteners includes a conventional threaded fastener 52 which is threadily connected to base 38. A shaft 54 is connected to threaded fastener 52 at one end of the shaft, and a knob 56 is fixed to the other end of the shaft. It may be appreciated that block housing 42 may be readily removed simply by rotating knobs 56 to disengage the threaded fasteners and thereby allow the housing 42 to be lifted off the mounting plate to expose the network and terminal connector blocks. When the connector blocks are exposed, wires may be electrically connected to the connector blocks in a conventional and well known fashion. Repositioning of the block housing encloses the connector blocks and protects them from accidental damage.

Jack assembly 16 includes jack housing 58. The jack housing includes a jack housing face 60 with parallel side walls 62 and 64 formed integral with face 60 and being substantially perpendicular thereto. The face has two lines of a plurality of identical jack apertures 66 in each line. A pair of jack retention bars 68 and 70 is mounted on the interior surface of face 60. The bars are secured to the interior of the face by a plurality of identical conventional screws 72. A plurality of conventional terminal jacks 74 is mounted on bar 70. In this instance, the jacks are hereinafter referred to as terminal jacks. A plurality of identical network jacks 76 identical in construction and mechanical operation to jacks 74 is mounted on retention bar 68 and those jacks 76 are hereinafter referred to as network jacks. The nomenclature applied to the jacks herein is for the purpose of identifying the jacks in their operation in this disclosure and they become the terminal jacks and network jacks when they are connected to the terminal connector blocks and the network connector blocks, respectively. It is to be understood that the function of terminal and network jacks may be reversed depending upon the connection of functions to the connector blocks.

Three identical conventional upper split rings 78, 80 and 82 are welded to upper side wall 64. Three identical conventional lower split rings 84, 86 and 88 are welded to lower side wall 62. The construction of the split rings 78, 80, 82, 84, 86 and 88 is conventional and well known, and the construction of those split rings is identical to each other.

Connector block assembly 14 is connected to jack assembly 16 by conventional wires as described hereinafter. Each of the terminal jacks 74 is connected to a respective terminal connector block 40 by a conventional wire 90. The interconnection of the terminal jacks with the respective terminal blocks is well known and understood in the art. Each of the network jacks 76 is connected to a respective network connector block 36 by a conventional wire 92 in a well known and conventional manner. Thus, terminal jacks 74 and network jacks 76 are connected to terminal connector blocks 40 and network connector blocks 36, respectively, to interconnect the jack and connector block assemblies.

A conventional telephone cable 93 is shown connected to patch panel 10 in order to illustrate the operation of a patch panel. The instant telephone cable is part of a communication system and as conventional is made up of a plurality of twisted pairs of wires. A portion of those twisted pairs of wires is connected to a communication network which is not shown herein but is well known to those skilled in the art. The remainder of the twisted pairs of wires is connected to a plurality of conventional and well known instrument terminals which are also not shown. The instrument terminals may be selectively mounted in any required location, whether it be on a floor or a wall of a private office or in a floor outlet in a general office area. The location of the instrument terminals is well known and understood by those skilled in the art. A telephone instrument or other device, such as, a modem may be connected to an instrument terminal. The variety of instruments which may be connected to a instrument terminal is known and well understood by those skilled in the art.

Each of the network connector blocks 36 is connected to a twisted pair of wires of cable 93 which twisted pair is connected to a selected portion of the communication network. In a like manner, each of the terminal connector blocks is connected to a twisted pair of wires of cable 93 which twisted pair is connected to a selected instrument terminal. Connection of the twisted pairs to the respective connector blocks is easily accomplished since all of the connector blocks are punch connectors. When the telephone cable is connected to the connector blocks, as described above, terminal jacks 74 are connected to respective instrument terminals and network jacks 76 are connected to respective selected portions of the communication network. It may be appreciated that a particular instrument terminal can be connected to a selected portion of the communication network, simply by connecting the proper terminal jack 74 to a given network jack 76.

FIGS. 5 and 6, provide two separate examples of how five identical patch panels 10 may be arranged on a flat vertical mounted surface, such as, a wall for selectively interconnecting an instrument terminal with a selected portion of a communication network. FIG. 5 shows five patch panels mounted on a wall with the split rings in a interlocking relationship wherein the top rings of a lower patch panel are placed in abutment with the bottom portion of the next upper patch panel. Each of the patch panels is secured to a vertical surface by a pair of fasteners, not shown, herein the fasteners, such as, screws are positioned in keyhole openings 24 and 26 and are secured to the mounting plate in a conventional fashion. Five patch panels are shown in FIG. 6 with the split rings separated. This arrangement takes up more space but facilitates the realignment of patch cords.

As may be seen in FIG. 5, the uppermost patch panel 10 has a conventional patch cord 94 connecting a selected terminal jack 74 and a selected network jack 76 of an adjacent patch panel. An end 96 of the patch cord is releasably mounted in terminal jack 74. The other end 98 of the patch cord is conventionally mounted in selected network jack 76 in the adjacent patch panel. It may be appreciated that network jack 76 is connected to the selected portion of a communication network. In the event that the same portion of the communication network is to be connected to another instrument terminal, it is necessary only to remove end 98 of the patch cord from the one instrument jack 76 and place it in another instrument jack and thereby connect the selected portion of a communication network with another instrument terminal. As an example, if a given individual has a particular phone number and that individual should change desks in the same area, it is a simple matter to change the location of that individual's telephone and still have the same extension number. It is only necessary to move the patch cord from one instrument jack to another.

Referring to FIGS. 5 and 6, only a minimal number of patch cords are shown therein. This is solely of purposes of illustration. If all of the jacks were connected by patch cords, the resulting number of wires could hide the interconnections. The patch cord 94 in the upper most portion of FIG. 5 is shown passing through split rings 80 and 82, then through rings 40 and 38 of the upper most patch panel, and into the rings 38 and 40 of the next adjacent patch panel. The cord passes through the split rings 84, 86 and 88 of the second patch panel and the split rings 78, 80 and 82 of the patch panel below the second patch panel. The utilization of the split rings keeps the cords aligned so that they do not drape over the jacks. It may be further noted that adjacent to each of the jacks there is a provision for identification of each of the jacks.

From the foregoing description, it may be readily appreciated once the patch panels are installed for a given operation, it is a simple matter to accommodate any changes which are made. The patch panel allows the switching of location with a minimum effort. It is only necessary to remove one end of a patch cord from a jack and place it in another jack. This can be handled by relatively unskilled personnel and may be done quickly. The punch connector blocks are securely covered. However, should it be necessary to make any substantial changes, the connector blocks may be readily exposed for making changes by qualified personnel. The specific embodiment disclosed herein identifies network and terminal connector blocks in one patch panel. It is to be understood that all connector blocks in a patch panel may be connected to either one, terminals or a portion of a communication network, to work with another patch panel which is connected to the other to have patch panel cords make connection through both patch panels.

Although a specific embodiment of the herein disclosed invention has been described in detail above and is shown in detail in the accompanying drawings, it is readily apparent that those skilled in the art may make a variety of modifications and changes without departing from the spirit and scope of this invention. It is to be expressly understood that the present invention is limited only by the accompanying claims.

What is claimed is:

1. A patch panel having a front side and an access on its front side for use in selectively interconnecting a selected portion of a communication network with a selected terminal including; a mounting plate, a plurality of connector blocks mounted on one side of the mounting plate, each of said connector blocks being adapted to be connected to a selected portion of a communication system, a second plurality of second connector blocks mounted on the one side of the mounting plate, each of said second connector blocks being adapted to be connected to a selected portion of a communication system, a jack connected to each of the first mentioned connector blocks, the jacks mounted on the one side of the mounting plate on the front side of the patch panel, and a second jack connected to each of the second connector blocks, the second jacks mounted on the one side of the mounting plate on the front side of the patch panel, the first mentioned and second connector blocks all mounted adjacent one another at one end of the mounting plate and the first mentioned and the second jacks all mounted adjacent one another at the other end of the mounting plate.

2. A patch panel having a front side and an access on its front side for use in selectively interconnecting a selected portion of a communication network with a selected terminal, as defined in claim 1, including a block housing being removably mounted on the mounting plate and covering the first mentioned and second connector blocks.

3. A patch panel having a front side and an access on its front side for use in selectively interconnecting a selected portion of a communication network with a selected terminal, as defined in claim 1, wherein said first mentioned jacks are positioned in line on the one side of the mounting plate, and said second jacks are positioned in a second line on the one side of the mounting panel spaced from and substantially parallel to the first mentioned line of first mentioned jacks.

4. A patch panel having a front side and an access on its front side for use in selectively interconnecting a selected portion of a communication network with a selected terminal, as defined in claim 1, including a plurality of split rings connected to the mounting plate on one side of the jacks, and a second plurality of split rings connected to the mounting plate on the other side of the jacks.

5. A patch panel having a front side and an access on its front side for use in selectively interconnecting a selected portion of a communication network with a selected terminal, as defined in claim 1, including a jack housing mounted on the mounting plate, said jack housing having apertures for receiving the first mentioned jacks and the second jacks.

6. A patch panel having a front side and an access on its front side for use in selectively interconnecting a selected portion of a communication network with a selected terminal including; a mounting plate, a plurality of connector blocks mounted on one side of the mounting plate, each of said connector blocks being adapted to be connected to a selected portion of a communication system, a second plurality of second connector blocks mounted on the one side of the mounting plate, each of said second connector blocks being adapted to be connected to another selected portion of the communication system, a jack connected to each of the first mentioned connector blocks, the jacks mounted on the one side of the mounting plate on the front side of the patch panel, a second jack connected to each of the second connector blocks, the second jacks mounted on the one side of the mounting plate on the front side of the patch panel, a pair of parallel jack retention bars mounted on the one side of the mounting plate, the first mentioned jacks are mounted on one of the retention bars, and said second jacks are mounted on the other retention bar.

7. A patch panel having a front side and an access on its front side for use in selectively interconnecting a selected portion of a communication network with a selected terminal, as defined in claim I, including a cable split ring mounted on the one side of the mounting plate adjacent to the connector blocks.

8. A patch panel having a front side and an access on its front side for use in selectively interconnecting a selected portion of a communication network with a selected terminal, as defined in claim I, including a block housing being removably mounted on the mounting plate and covering the connector blocks, the first mentioned jacks are positioned in line on the one side of the mounting plate, and said second jacks are positioned in a second line on the one side of the mounting panel spaced from and substantially parallel to the first mentioned line of first mentioned jacks.

9. A patch panel having a front side and an access on its front side for use in selectively interconnecting a selected portion of a communication network with a selected terminal, as defined in claim 1, including a block housing removably mounted on the mounting plate and covering the connector blocks, a plurality of split rings connected to the mounting plate on one side of the jacks, and a second plurality of split rings connected to the mounting plate on the other side of the jacks.

10. A patch panel having a front side and an access on its front side for use in selectively interconnecting a selected portion of a communication network with a selected terminal, as defined in claim 1, including a block housing removably mounted on the mounting plate and covering the connector blocks, and a jack housing mounted on the mounting plate, said jack housing having apertures receiving the first mentioned jacks and the second jacks.

11. A patch panel having a front side and an access on its front side for use in selectively interconnecting a selected portion of a communication network with a selected terminal including; a mounting plate, a plurality of connector blocks mounted on one side of the mounting plate, each of said connector blocks being adapted to be connected to a selected portion of a communication system, a second plurality of second connector blocks mounted on the one side of the mounting plate, each of said second connector blocks being adapted to be connected to another selected portion of the communication system, a jack connected to each of the first mentioned connector blocks, the jacks mounted on the one side of the mounting plate on the front side of the patch panel, a second jack connected to each of the second connector blocks, the second jacks mounted on the one side of the mounting plate on the front side of the patch panel, a pair of parallel jack retention bars mounted on the one side of the mounting plate, the first mentioned jacks are mounted on one of the retention bars, said second jacks are mounted on the other retention bar, and a block housing is removably mounted on the mounting plate and covering the connector blocks.

12. A patch panel having a front side and an access on its front side for use in selectively interconnecting a selected portion of a communication network with a selected terminal including; a mounting plate, a plurality of connector blocks mounted on one side of the mounting plate, each of said connector blocks being adapted to be connected to a selected portion of a communication system, a second plurality of second connector blocks mounted on the one side of the mounting plate, each of said second connector blocks being adapted to be connected to another selected portion of the communication system, a jack connected to each of the first mentioned connector blocks, the jacks mounted on the one side of the mounting plate on the front side of the patch panel, a second jack connected to each of the second connector blocks, the second jacks mounted on the one side of the mounting plate on the front side of the patch panel, a pair of parallel jack retention bars mounted on the one side of the mounting plate, the first mentioned jacks are mounted on one of the retention bars, said second jacks are mounted on the other retention bar, a jack housing mounted on the mounting plate, said jack housing having apertures receiving the first mentioned jacks and the second jacks, a plurality of split rings connected to the mounting plate on one side of the jacks, a second plurality of split rings connected to the mounting plate on the other side of the jacks, and a block housing removably mounted on the mounting plate and covering the connector blocks.

13. A patch panel having a front side and an access on its front side for use in selectively interconnecting a selected portion of a communication system with a terminal including; a mounting plate, a plurality of connector blocks mounted on one side of the mounting plate, a portion of the plurality of connector blocks being network connector blocks, each of the network connector blocks being adapted to be connected to a selected portion of a communication network, each of the remainder of the connector blocks being terminal connector blocks, each of the terminal connector blocks being adapted to be connected to a selected terminal, each of the network connector blocks connected to a respective network jack, said network jacks mounted on the one side of the mounting plate at the front of the patch panel, each of the terminal connector blocks connected to a respective terminal jack, said terminal jacks being mounted on the one side of the mounting late at the front of the patch panel, the network and terminal connector blocks all mounted adjacent one another at one end of the mounting plate and the network and terminal jacks all mounted adjacent one another at the other end of the mounting plate, and a patch cord having one end removably connected to a network jack and the other end removably connected to a terminal jack to provide a means to connect a selected terminal with a selected portion of the communication network.

14. A patch panel having a front side and an access on its front side for use in selectively interconnecting a selected portion of a communication system with a terminal, as defined in claim 13, including a block housing being removably mounted on the mounting plate and covering the connector blocks.

15. A patch panel having a front side and an access on its front side for use in selectively interconnecting a selected portion of a communication system with a terminal, as defined in claim 13, wherein said network jacks are positioned in line on the one side of the mounting plate, and said terminal jacks are positioned in a second line on the one side of the mounting panel spaced from and substantially parallel to the first mentioned line of network jacks.

16. A patch panel having a front side and an access on its front side for use in selectively interconnecting a selected portion of a communication system with a terminal, as defined in claim 13, wherein said network jacks are positioned in line on the one side of the mounting plate, said terminal jacks are positioned in a second line on the one side of the mounting panel spaced from and substantially parallel to the first mentioned line of network jacks, a jack housing mounted on the mounting plate, said jack housing having apertures receiving the network jacks and the terminal jacks, and a block housing removably mounted on the mounting plate covering the connector blocks.

17. A patch panel having a front side and an access on its front side for use in selectively interconnecting a selected portion of a communication system with a terminal, as defined in claim 13, wherein said network jacks are positioned in line on the one side of the mounting plate, said terminal jacks are positioned in a second line on the one side of the mounting panel spaced from and substantially parallel to the first mentioned line of network jacks, a jack housing mounted on the mounting plate, said jack housing having apertures receiving the network jacks and the terminal jacks, a block housing removably mounted on the mounting plate and covering the connector blocks, a plurality of split rings connected to the mounting plate on one side of the jacks, and a second plurality of split rings connected to the mounting plate on the other side of the jacks.

18. A patch panel having a front side and an access on its front side for use in selectively interconnecting a selected portion of a communication system with a terminal, as defined in claim 13, wherein said network jacks are positioned in line on the one side of the mounting plate, said terminal jacks being positioned in a second line on the one side of the mounting panel spaced from and substantially parallel to the first mentioned line of network jacks, a jack housing mounted on the mounting plate, said jack housing having apertures receiving the network jacks and the terminal jacks, a block housing removably mounted on the mounting plate and covering the connector blocks, a plurality of split rings connected to the mounting plate on one side of the jacks, a second plurality of split rings connected to the mounting plate on the other side of the jacks, and means for holding the mounting plate onto a vertical support.

19. A patch panel having a front side and an access on its front side for use in selectively interconnecting a selected portion of a communication system with a terminal, as defined in claim 13, including a pair of parallel jack retention bars mounted on the one side of the mounting plate, said network jacks mounted on one of the retention bars, said terminal jacks mounted on the other retention bar, a block housing removably mounted on the mounting plate and covering the connector blocks, a plurality of split rings connected to the mounting plate on one side of the jacks, and a second plurality of split rings connected to the mounting plate on the other side of the jacks.

20. A patch panel having a front side and an access on its front side for use in selectively interconnecting a selected portion of a communication system with a terminal, as defined in claim 13, including a pair of parallel jack retention bars mounted on the one side of the mounting plate, said network jacks mounted on one of the retention bars, said terminal jacks mounted on the other retention bar, a jack housing mounted on the mounting plate, said jack housing having apertures receiving the network jacks and the terminal jacks, a block housing being removably mounted on the mounting plate and covering the connector blocks, said block housing having a front panel, a plurality of split rings connected to the jack housing on one side of the jacks, a second plurality of split rings connected to the jack housing on the other side of the jacks, and a cable split ring mounted on the one side of the mounting plate adjacent to the connector blocks.

* * * * *

UNITED STATES PATENT AND TRADEMARK OFFICE
CERTIFICATE OF CORRECTION

PATENT NO. : 5,145,380

DATED : September 8, 1992

INVENTOR(S) : Holcomb et al.

It is certified that error appears in the above-identified patent and that said Letters Patent is hereby corrected as shown below:

In the Claims, Column 8, Line 49, cancel "late" and substitute -- plate

Signed and Sealed this

Seventh Day of September, 1993

Attest:

BRUCE LEHMAN

Attesting Officer

Commissioner of Patents and Trademarks